United States Patent [19]

Aziz et al.

[11] 4,176,095

[45] Nov. 27, 1979

[54] REINFORCED XYLENE-FORMALDEHYDE RESIN COMPOSITIONS

[75] Inventors: Walid Y. Aziz, Warrensville; Lawrence E. Ball, Cuyahoga Falls, both of Ohio

[73] Assignee: Standard Oil Company, Cleveland, Ohio

[21] Appl. No.: 925,914

[22] Filed: Jul. 19, 1978

[51] Int. Cl.$^2$ ............................ C08L 1/02; C08L 5/00
[52] U.S. Cl. ...................................... 260/9; 260/37 R; 528/247
[58] Field of Search ................................ 260/9, 37 R

[56] References Cited

U.S. PATENT DOCUMENTS

| | | | |
|---|---|---|---|
| 3,167,530 | 1/1965 | Goodrich | 528/247 |
| 3,372,147 | 3/1968 | Heinrich et al. | 528/247 |
| 3,406,132 | 10/1968 | Winegartner | 260/17.2 |
| 4,082,728 | 4/1978 | Aziz et al. | 528/247 |

*Primary Examiner*—Edward M. Woodberry
*Attorney, Agent, or Firm*—John F. Jones; Larry W. Evans

[57] ABSTRACT

High molecular weight, thermoplastic xylene-formaldehyde polymers are reinforced by inclusion therein of certain fibers and other materials such as carbon fibers, cotton flock, wood flour, granulated cork and glass fibers.

7 Claims, No Drawings

REINFORCED XYLENE-FORMALDEHYDE RESIN COMPOSITIONS

The present invention relates to reinforced thermoplastic xylene-formaldehyde resin compositions and more particularly pertains to reinforced thermoplastic, high molecular weight, high softening xylene-formaldehyde polymers having improved physical properties which contain reinforcing agents including carbon fiber, cotton flock, wood flour, granulated cork, mica, carbon black, glass fibers, glass cloth, asbestos, graphite, synthetic fibers, aluminum powder, cellulosics, and others, and to a process for preparing such materials by dry blending or melt blending or both.

This invention employs xylene-formaldehyde polymers described and claimed in the co-pending U.S. patent application of Walid Y. Aziz, Lawrence E. Ball and Irving Rosen, Serial No. 716,545, filed Aug. 23, 1976, now U.S. Pat. No. 4,082,728.

The xylene-formaldehyde polymers useful in the present invention have molecular weights of 20,000 and above, they are thermoplastic, contain little or no bound oxygen (less than 2% by weight), are light in color and have extremely high softening points or glass-transition temperatures (120° C. and above). These preferred xylene-formaldehyde polymers are prepared by the reaction of xylene, preferably m-xylene, and formaldehyde or a formaldehyde-yielding material at an elevated temperature in the range of 60° to 200° C. in the presence of an acid catalyst in a closed system from which molecular oxygen is preferably excluded. Substantially equal molar amounts of xylene and formaldehyde are preferred for use in the manufacture of these resins.

Most preferred resins for the purposes of this invention are thermoplastic xylene-formaldehyde polymers which contain less than 2% oxygen by weight and have a molecular weight greater than 20,000 which are prepared by reacting formaldehyde or a formaldehyde-producing material with m-xylene in the presence of an acid catalyst at an elevated temperature in a closed reactor from which air is excluded during the reaction.

The blends of xylene-formaldehyde resin and reinforcing agent are composed of from 25 to 90% by weight of the resin and correspondingly from 75 to 10% by weight of the reinforcing agent. The blends can be made by mixing the reinforcing agent with the polymer melt in an internal mixer or by first dry blending the powdered resin and reinforcing agent followed by fusion of the mixture at a temperature near or above the softening temperature of the resin.

Reinforcing agents which are useful in the present invention include one or more of materials including carbon fibers, cotton flock, glass fibers, wood flour, granulated cork, mica, carbon black, glass, asbestos, glass cloth, graphite, synthetic fibers including acrylic fibers, polyester fibers, nylon fibers, and the like, aluminum powder, cellulosics, calcium silicate, bronze powder and ferric oxide.

Use of the reinforcing agents embodied in this invention in xylene-formaldehyde resins improves one or more of the properties of strength, impact resistance and heat resistance of the base xylene-formaldehyde resin.

Reinforced xylene-formaldehyde resins of this invention are useful in the manufacture of molded plastic parts and articles such as bottles, cups, plates, boxes, and the like, and they are particularly useful for blending with well known plastic materials such as polystyrene, polymethyl methacrylate, polymethyl acrylate, polyvinyl acetate, polyindene, polycarbonate, acrylonitrile copolymers, polyvinyl chloride, polyolefins, polyesters, nylons, polyphenylene oxide, polysulfones, and the like, for upgrading these materials insofar as softening temperature, impact resistance and creep resistance are concerned. Because of their relative low cost, the resins of this invention when blended with more conventional plastics also have the advantage of lowering the overall cost of the blends.

In the following illustrative examples, the amounts of ingredients are expressed in parts by weight unless otherwise specified.

EXAMPLE 1

A high molecular weight, light colored polymer containing essentially no oxygen was prepared from m-xylene and paraformaldehyde using the following ingredients:

| Ingredient | Moles | Grams |
| --- | --- | --- |
| m-xylene | 2 | 212 |
| paraformaldehyde | 2 | 63.15 |
| perchloric acid, 60% pure | 2% by weight of monomers | 9.19 |

The m-xylene was placed in a reactor and was stirred for about 15 minutes under a nitrogen purge. The paraformaldehyde was then added and the mixture was heated with continued stirring to 90° C. under a closed system (i.e., no air from the atmosphere was allowed to enter the reaction system). When the reaction mixture reached 90° C., the perchloric acid was added. After 3 hours, the system was opened and a side arm and reflux condenser were added for the collection of water. The degree of conversion was determined by measurement of the water removed. At 92% conversion, a nitrogen purge was reinstated and a final conversion of 98.83% was obtained. The resulting polymer was dissolved in benzene and was coagulated with methanol, filtered and vacuum dried for 48 hours at 50° C. The final polymer was a glassy solid having the following properties:

| | |
| --- | --- |
| ASTM heat-distortion temperature D-64A, 264 psi | 120° C. |
| Tg | 140° C. |
| ASTM flexural strength D-790 | $0.3 \times 10^3$ psi |
| ASTM flexural modulus D-790 | $1.3 \times 10^5$ psi |
| Rockwell hardness (M) | 98 |
| notched Izod impact strength D-256 | 0.12 foot pounds per inch of notch |

EXAMPLE 2

A mixture of 50 parts by weight of the xylene-formaldehyde polymer of Example 1 and 50 parts by weight of ¼" glass fibers (PPG Industries) was prepared in a Brabender plasticorder by mixing at 200° C. for 2 minutes at 35 rpm. A test bar specimen of this mixture was molded at 200° C. and 4000 psi. The test bar of this mixture was found to have the following physical properties:

| | |
| --- | --- |
| ASTM heat-distortion temperature | 124° C. |

-continued

| | |
|---|---|
| D-64A, 264 psi | |
| ASTM flexural strength D-790 | $3.54 \times 10^3$ psi |
| ASTM flexural modulus D-790 | $10.5 \times 10^5$ psi |
| ASTM tensile strength D-638 | $1.01 \times 10^3$ psi |
| notched Izod impact strength D-256 | 1.29 foot pounds per inch of notch |
| Rockwell hardness (M) | 94 |

EXAMPLE 3

A mixture of 50 parts by weight of the xylene-formaldehyde polymer of Example 1 and 50 parts by weight of carbon fiber (1/32" Union Carbide) was prepared by dry blending the two materials in a Waring blendor for 10 minutes followed by melt blending in a Brabender plasticorder for 2 minutes at 200° C. Bar specimens for physical testing were molded from the resulting mixture at 200° C. and 4000 psi. The test bars were found to have the following properties:

| | |
|---|---|
| ASTM heat-distortion temperature D-64A, 264 psi | 129° C. |
| ASTM flexural strength D-790 | $3.76 \times 10^3$ psi |
| ASTM flexural modulus D-790 | $11.2 \times 10^5$ psi |
| ASTM tensile strength D-638 | $2.26 \times 10^3$ psi |
| notched Izod impact strength D-256 | 0.27 foot pounds per inch of notch |
| Rockwell hardness (M) | 81 |

EXAMPLE 4

A mixture of 50 parts by weight of the xylene-formaldehyde polymer described in Example 1 and 50 parts by weight of cotton flock was prepared by first dry blending these two materials in a Waring blendor for 10 minutes followed by melt mixing in a Brabender plasticorder for 2 minutes at 200° C. The bar specimens used for physical testing were molded at 200° C. and 4000 psi. The following physical properties were observed for this mixture:

| | |
|---|---|
| ASTM heat-distortion temperature D-64A, 264 psi | 117° C. |
| ASTM flexural strength D-790 | $4.45 \times 10^3$ psi |
| ASTM flexural modulus D-790 | $8.49 \times 10^5$ psi |
| ASTM tensile strength D-638 | $2.17 \times 10^3$ psi |
| notched Izod impact strength D-256 | 0.66 foot pounds per inch of notch |
| Rockwell hardness (M) | 98 |

EXAMPLE 5

A mixture of 50 parts by weight of the xylene-formaldehyde resin of Example 1 and 50 parts by weight of wood flour (100-mesh white pine) was prepared by first dry blending these materials in a Waring blendor for 10 minutes followed by melt mixing in a Brabender plasticorder for 2 minutes at 200° C. Bar specimens for physical testing were compression molded from the mixture at 200° C. and 4000 psi. The mixture had the following properties:

| | |
|---|---|
| ASTM heat-distortion temperature D-64A, 264 psi | 116° C. |
| ASTM flexural strength D-790 | $3.25 \times 10^3$ psi |
| ASTM flexural modulus D-790 | $7.41 \times 10^5$ psi |
| ASTM tensile strength D-638 | $0.39 \times 10^3$ psi |
| notched Izod impact strength D-256 | 0.17 foot pounds per inch of notch |
| Rockwell hardness (M) | 92 |

EXAMPLE 6

A mixture of 50 parts by weight of the xylene-formaldehyde polymer of Example 1 and 50 parts by weight of granulated cork (10/20 mesh) was prepared by first dry blending these two materials in a Waring blendor for 10 minutes followed by melt blending in a Brabender plasticorder for 2 minutes at 200° C. The test bar specimens which were molded from this mixture at 200° C. and 4000 psi were found to have the following physical properties:

| | |
|---|---|
| ASTM heat-distortion temperature | 91° C. |
| ASTM flexural strength | $1.68 \times 10^3$ psi |
| ASTM flexural modulus | $1.65 \times 10^5$ psi |
| ASTM tensile strength | $0.83 \times 10^3$ psi |
| notched Izod impact strength | 0.21 foot pounds per inch of notch |
| Rockwell hardness (M) | 75 |

EXAMPLE 7

A mixture of 50 parts by weight of the xylene-formaldehyde resin of Example 1 and 50 parts by weight of E-glass (1/16" fibers) was prepared by first dry blending the two materials in a Waring blendor for 10 minutes followed by melt mixing in a Brabender plasticorder at 200° C. for 2 minutes. Test bar specimens which were compression molded from the mixture at 200° C. and 4000 psi were found to have the following physical properties:

| | |
|---|---|
| ASTM heat-distortion temperature | 117° C. |
| ASTM flexural strength | $4.12 \times 10^3$ psi |
| ASTM flexural modulus | $13.0 \times 10^5$ psi |
| notched Izod impact strength | 0.16 foot pounds per inch of notch |
| Rockwell hardness (L scale) | 108 |

EXAMPLE 8

A mixture of 50 parts by weight of the xylene-formaldehyde polymer of Example 1 and 50 parts by weight of mica (Suzorite Mica, 200-H, Marietta Resources International, Ltd.) was prepared by first dry blending the two materials in a Waring blendor followed by a melt blending in a Brabender plasticorder for 2 minutes at 200° C. Test bar specimens which were compression molded from this mixture at 200° C. and 4000 psi were found to have the following physical properties:

| | |
|---|---|
| ASTM heat-distortion temperature | 114° C. |

| -continued | |
|---|---|
| ASTM flexural strength | $3.31 \times 10^3$ psi |
| ASTM flexural modulus | $16.7 \times 10^5$ psi |
| ASTM tensile strength | $0.48 \times 10^3$ psi |
| notched Izod impact strength | 0.18 foot pounds per inch of notch |
| Rockwell hardness (L) | 104 |

We claim:

1. The composition comprising a blend of a thermoplastic xylene-formaldehyde polymer and a reinforcing agent wherein the xylene-formaldehyde polymer is one having a softening point of at least 120° C. and containing less than 2% oxygen by weight and having a molecular weight greater than 20,000 and wherein the reinforcing agent is at least one member selected from the group consisting of carbon fibers, cotton flock, wood flour, granulated cork, mica and glass fibers.

2. The composition of claim 1 wherein the ratio of xylene-formaldehyde polymer to reinforcing agent is in the range of from 25 to 90% by weight of the polymer and correspondingly from 75 to 10% by weight of the reinforcing agent.

3. The composition of claim 2 wherein the reinforcing agent is carbon fibers.

4. The composition of claim 2 wherein the reinforcing agent is cotton flock.

5. The composition of claim 2 wherein the reinforcing agent is wood flour.

6. The composition of claim 2 wherein the reinforcing agent is granulated cork.

7. The composition of claim 2 wherein the reinforcing agent is glass fibers.